United States Patent [19]
Astley

[11] Patent Number: 4,687,258
[45] Date of Patent: Aug. 18, 1987

[54] REMOTE CONTROL SYSTEM FOR A LOCOMOTIVE

[75] Inventor: George W. Astley, Edmonton, Canada

[73] Assignee: Canadian National Railway Company, Montreal, Canada

[21] Appl. No.: 807,609

[22] Filed: Dec. 11, 1985

[51] Int. Cl.[4] ............................................. B60T 13/68
[52] U.S. Cl. ......................................... 303/3; 303/15; 303/20; 246/187 A
[58] Field of Search .................... 303/3, 15, 16, 20, 40, 303/29; 246/187 B, 187 A, 187 C, 3, 4, 5

[56] References Cited

U.S. PATENT DOCUMENTS

| | | | |
|---|---|---|---|
| 2,998,513 | 8/1961 | Taczak et al. | 246/3 |
| 3,096,056 | 7/1963 | Allison | 246/187 |
| 3,293,549 | 12/1966 | Patterson | 325/64 |
| 3,368,073 | 2/1968 | Baughman | 246/187 B |
| 3,374,035 | 3/1968 | Howard | 303/20 |
| 3,378,817 | 4/1968 | Vitt | 246/187 B |
| 3,402,972 | 9/1968 | Cooper et al. | 303/20 |
| 3,539,226 | 11/1970 | Barber | 303/20 |
| 3,553,449 | 1/1971 | Hathaway | 246/3 |
| 3,610,363 | 10/1971 | Hartley | 180/98 |
| 4,067,264 | 1/1978 | Ensink | 105/456 |
| 4,093,161 | 6/1978 | Auer, Jr. | 246/5 |
| 4,179,624 | 12/1979 | Shindo et al. | 307/3 |
| 4,266,273 | 5/1981 | Dobler et al. | 364/426 |
| 4,303,215 | 12/1981 | Maire | 246/182 B |
| 4,335,381 | 6/1982 | Palmer | 340/825.21 |

FOREIGN PATENT DOCUMENTS

| | | |
|---|---|---|
| 670272 | 9/1963 | Canada . |
| 2117459 | 10/1972 | Fed. Rep. of Germany . |
| 2035487 | 6/1980 | United Kingdom ................... 303/15 |
| 432571 | 4/1973 | U.S.S.R. . |
| 669375 | 11/1976 | U.S.S.R. . |

OTHER PUBLICATIONS

"Radio-Controlled Shunting Locomotives from Track--Side or Fixed-Site Look-Out", Rail International, Autumn 1984, pp. 21-23.

Primary Examiner—John W. Caldwell, Sr.
Assistant Examiner—Alvin Oberley
Attorney, Agent, or Firm—Larson and Taylor

[57] ABSTRACT

A remote control system for a locomotive utilizes air from the train air brake line to control the independent locomotive brakes. The system provides a portable remote control unit for easy attachment to a locomotive utilizing locomotive power and trainline wires to provide input for the locomotive operation. The system comprises an air link between the train air brake line and the independent locomotive brake line, brake control valve in the air link, operating control for the brake control valve utilizing air from the train air brake line to control air pressure in the independent locomotive brake line, receiver attached to the locomotive for receiving radio instructions and producing signals for the operating control for the brake control valve, direction of travel and throttle position for the locomotive, and transmitter having control switches for an operator remote from the locomotive to send radio instructions to the receiver.

16 Claims, 4 Drawing Figures

SIGNAL TRANSMITTER

REMOTE CONTROL SYSTEM FOR A LOCOMOTIVE

The present invention relates to the remote control operation of a locomotive. More specifically, the present invention provides a portable remote control system that utilizes air from the train air brake line to control the independent locomotive brakes, and utilizes locomotive power and trainline wires to provide input for the locomotive operation.

Remote control operation of a locomotive is useful for controlling a vehicle from track side. This type of operation can avoid the necessity of having a helper and is particularly useful in freight yards where some road/rail crossings have neither lights nor gates. The use of remote control allows the locomotive operator to stand at the crossing and operate the locomotive from that position. This avoids the necessity of having a second person at the crossing. A remote control operation is also useful in railway shop tracks where locomotives require switching for refueling, adding sand, oil etcetera. Remote control allows one man to perform the switching operations as well as these maintenance operations. It also allows one man to switch locomotives in and out of a shop and join or cut off locomotive units for multiple operation with complete safety.

Locomotives today that are fitted with remote control operation, require an extensive modification and an expensive installation which cannot easily be removed. The term "locomotive" referred to throughout the specification and claims refers to a single unit or multiple units that are controlled by one operator from one control stand.

The present invention provides in one embodiment, a portable remote control system for easy attachment to a locomotive unit equipped for multiple unit operation. The remote control system has a relatively low cost and is fail safe. A portable transmitter provides easy operation for a locomotive operator familiar with the normal controls in a locomotive cab. When locomotive units are equipped for multiple unit operation, they have a multiple operation electrical receptacle mounted at one or both ends of the locomotive unit and a special cable and plug arrangement are provided to plug into the receptacles of the adjacent units. Thus the operating circuits between locomotive units are joined and multiple units can be operated from a single cab. Each locomotive unit has air brake hoses and valves on each end, so that when coupled together, the brakes are operated from one cab. Most locomotives have two braking systems, the first is the train braking system which extends to every car and operates with compressed air, normally in a charged or pressurized mode. When compressed air is drained from the system, the brakes are applied. Thus in the event of any hose or connection failure in a train, the brakes are applied immediately. The second braking system is the independent locomotive brake system which operates the brakes on the locomotive only. When several locomotive units are coupled together, the independent locomotive brakes operate on all the units. This brake line must be pressurized to apply the brakes which is the reverse of the train braking system. The brakes are off when there is no air pressure and come on when there is a build up of pressure in the independent locomotive application and release brake line. When hostling or switching locomotives around shop tracks, or light to medium switching of cars in yards, only the independent locomotive brakes are used.

The present invention utilizes the concept of taking a small quantity of air from the train air brake line and using this air by means of valves to control the pressure of air in the independent locomotive brake line and thus control the braking for the independent locomotive brakes. The flow rate from the air brake line is limited so the small loss of air from the train air brake line does not apply the train brakes.

Safety precautions are built into the remote control system to provide for an emergency brake application if an operator presses the emergency brake button on the transmitter or if there is a loss of signal for any reason. The system includes a hand held transmitter with buttons or switches for operating brakes, throttle positions, direction of travel, warning signals etcetera. The throttle button has several steps for different throttle positions, and the brake button has a semi-depressed position and fully depressed position for a graduated application and release of the independent locomotive brakes. The transmitter has an encoder that encodes a number of signals representing the different button positions and transmits them to a receiver on the locomotive. The receiver has a decoder which feeds the signals to a series of relays to activate circuits used for the operation of the locomotive and also for application and release of the independent locomotive brakes. An air link system is provided for connecting the train air brake line and the independent locomotive brake line. Solenoid valves are provided in the air link system for applying and releasing the locomotive brakes. Electric cable from the solenoid valves leads to a control head which includes the receiver, decoder and relays for locomotive operating circuits.

The present invention provides a remote control system for a locomotive having a train air brake line and an independent locomotive brake line, comprising air link between the train air brake line and the independent locomotive brake line, brake control valve means in the air link, operating means for the brake control valve means utilizing air from the train air brake line to control air pressure in the independent locomotive brake line, receiver means attached to the locomotive for receiving ratio instructions and producing signals for the operating means for the brake control valve means, direction of travel and throttle position for the locomotive, and transmitter means having control switches for an operator remote from the locomotive to send radio instructions to the receiver means.

In other embodiments of the invention, the brake control valve means in the air link includes the solenoid operated brake release valve adjacent the independent locomotive brake line, the brake release valve adapted to open when solenoid is energized to vent the independent locomotive brake line, and a solenoid operated brake application valve between the brake release valve and the train air brake line, the brake application valve adapted to close when solenoid is energized to stop compressed air passing from the train air brake line to the independent locomotive brake line. In one embodiment, a solenoid operated emergency brake valve is located in the air link between the train air brake line and the brake application valve, the emergency brake valve adapted to close when solenoid is energized to allow compressed air to pass through the air link, and open when solenoid is de-energized to vent the train air brake line.

A first pressure switch is preferably located adjacent the train air brake line adapted to open circuits to prevent locomotive operation if pressure drops below a preset value, the preset value preferably being about 60 lbs. per sq. in. Furthermore, a second pressure switch is preferably supplied adjacent the independent locomotive brake line, adapted to produce a signal to energize solenoid for the brake application valve when the pressure in the independent locomotive brake line rises to a preset value, preferably around 45 lbs. per sq. in.

In drawings which illustrate embodiments of the invention:

Figure 1:
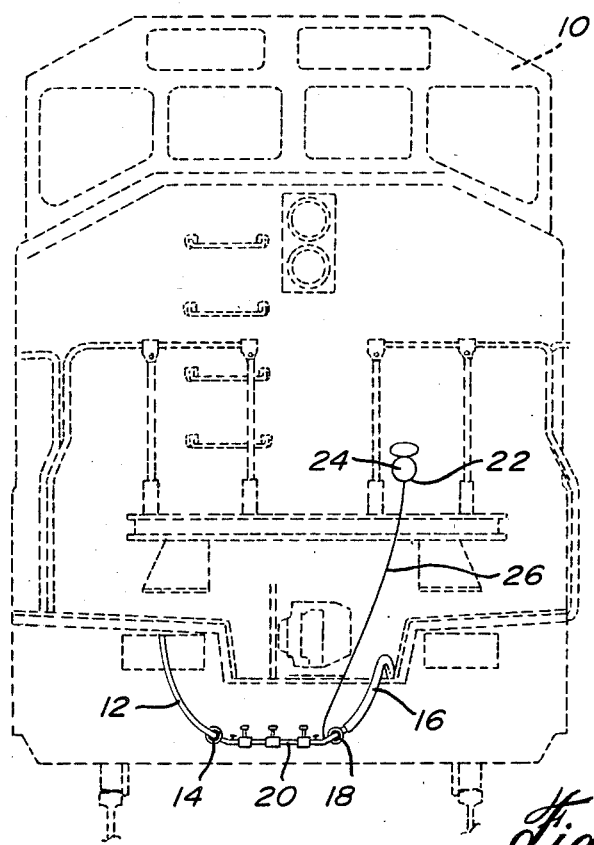
FIG. 1 is an end view of a locomotive unit showing an installation of one embodiment of the remote control system according to the present invention.

Referring now to the drawings, FIG. 1 illustrates an end view of a locomotive 10 having a train air brake line hose 12 with a Glad hand connector 14 at the end of the hose 12 and an independent locomotive brake line hose 16 with a Glad hand connector 18 at the end of the hose 16. The train air brake line hose 12 is connected to brakes on cars along the train and the independent locomotive brake line hose 16 is connected to the locomotive brakes. If several units are coupled together for multiple operation, the independent locomotive brake line 16 operates the locomotive brakes on all units. An air link assembly 20 which forms part of the remote control system is coupled between the two Glad hand connectors 14 and 18 of the hoses 12 and 16. The installation of the air link assembly 20 requires the Glad hand connectors to be coupled, and the angle cock valves (not shown) for the two hoses 12 and 16 opened. Multiple operation receptacles 22 are standard on all locomotive units used for multiple operation. The receptacle 22 has a hinged cover which when closed protects the connections. A power head assembly 24 which includes electrical connection 26 to the air link assembly 20 plugs into the receptacle 22 and is locked in place by the hinge cover (not shown). The remote control system includes only the combination of the power head assembly 24 and the air link assembly 20. No other changes need be made to the locomotive unit for remote control operation.

Figure 2:
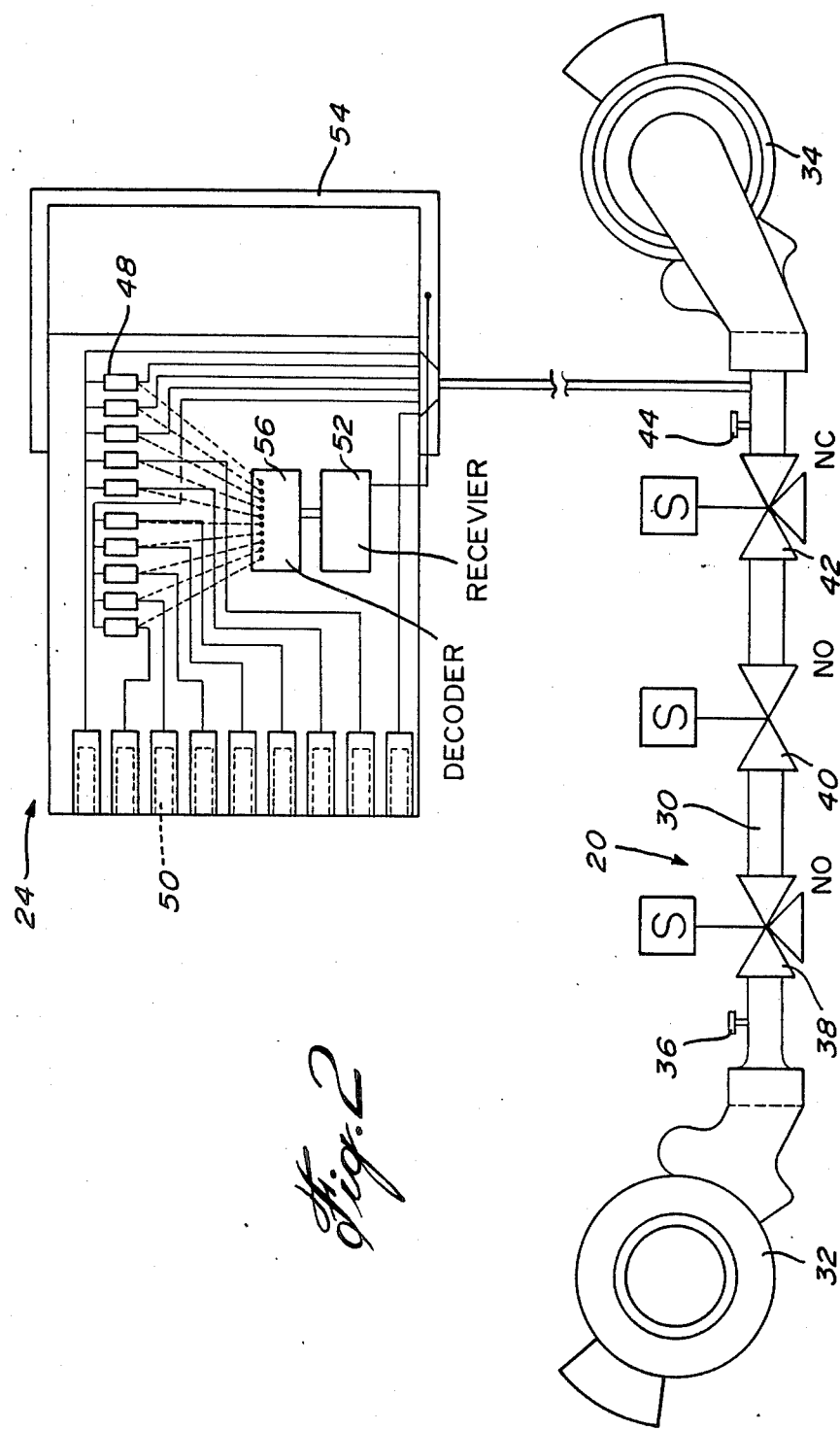
FIG. 2 is a schematic view of the power head assembly and air link assembly forming the remote control system.

FIG. 2 illustrates the power head assembly 24 and the air link assembly 20. The air link assembly 20 comprises a yoke in the form of a short manifold 30 extending from a first Glad hand connector 32 for connection to the train air brake line to a second Glad hand connector 34 for connection to the independent locomotive brake line. Adjacent the Glad hand connector 32 is a first pressure switch 36 followed by a solenoid operated emergency brake valve 38. This valve 38 is normally open when the solenoid is not energized, allowing compressed air from the train air brake line to vent thus providing emergency brake application. An interruption of power de-energizes the solenoid causing an emergency brake application. A solenoid operated brake application valve 40 is positioned adjacent the emergency brake valve 38. The valve 40 is normally in the open position when the solenoid is deenergized and has an orifice allowing compressed air to pass through the yoke manifold 30. The size of orifice depends upon the train air brake pipe pressure and is sized to match a normal independent application of the independent locomotive brakes. The flow of compressed air through the orifice must not be sufficient to operate the train air brakes. The compressed air passing through the orifice is for controlling the independent locomotive brakes. A solenoid operated brake release valve 42 is next in the yoke manifold 30 which is closed when the solenoid is de-energized allowing compressed air from the brake application valve 40 to pass to the independent locomotive brake line. When the solenoid for the brake release valve 42 is energized, compressed air from the independent locomotive air brake line is vented. A second pressure switch 44 prevents too high a build up of air pressure in the independent locomotive brake line. A power cable 26 connects circuits for the solenoid and pressure switches 36 and 44 to a series of relays 48 in the power head assembly 24. The relays 48 are positioned in the operating circuits for the locomotive, the circuits connect to female sockets 50 for engagement with male plugs in the multiple operation receptacle 22 on the locomotive 10. The number of relays 48 depend on the number of operations and actions that are required for the remote control system. The power head assembly 24 is formed in an enclosure for protection, the sockets 50 mate with the plugs in the receptacle 22, and the hinged cover (not shown) locks the power head assembly 24 in place. A receiver is built into the power head assembly 24 with an aerial 54 being a handle for carrying the assembly. The receiver 52 permits signals to be received from a signal transmitter. A decoder 56 receives the signals in code from the receiver 52 and provides power to the operating coils of the relays 48 as called for by the code. Power for operating the assembly 24 comes from power source plugs in the receptacle 22. The decoder is capable of decoding as many signals as there are relays in the control head. The receiver 52 and the decoder 56 are commercially available units using one frequency. Various manufacturers such as Motorola, Daytek etcetera, make such units. In one unit, a decoder handles from 60 to 70 different signal codes so that if nine or ten signal codes are required for remote operation of one locomotive, then six or seven different locomotives may work in an area using one frequency without interfering with other locomotives.

Figure 3:
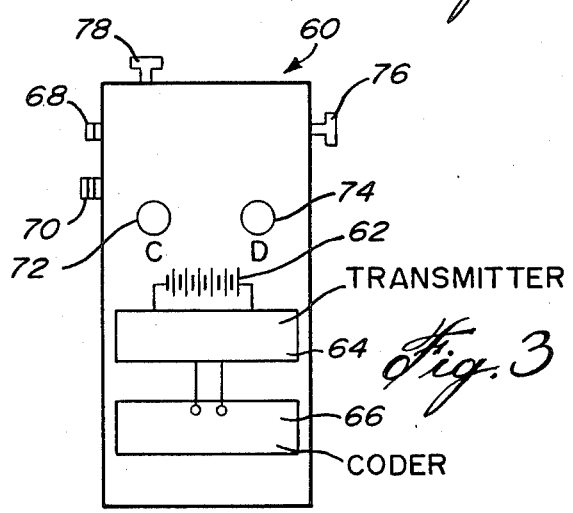
FIG. 3 is a schematic view of the transmitter.

A signal transmitter unit 60 is illustrated in FIG. 3 having a battery power source 62 for a ratio transmitter 64 to transmit on a single frequency to the receiver 52 in the power head assembly 24. An encoder 66 codes the signals as called for by the different buttons and switches on the signal transmitter unit 60. A brake button 68 has two steps or positions for brake application and brake release. A throttle button 70 has three steps or positions for three different throttle positions. More than three or less than three throttle positions can be provided if desired. A forward and reverse switch 72 for the locomotive is located on the face of the unit 60 as well as a bell on/off switch. A horn blow switch 76 is shown on the side of the unit. An emergency switch 78 is located on top of the unit 60 to place the train brake into the emergency position. The actual locations of the switches and buttons may be changed to suit operator requirements.

Figure 4:
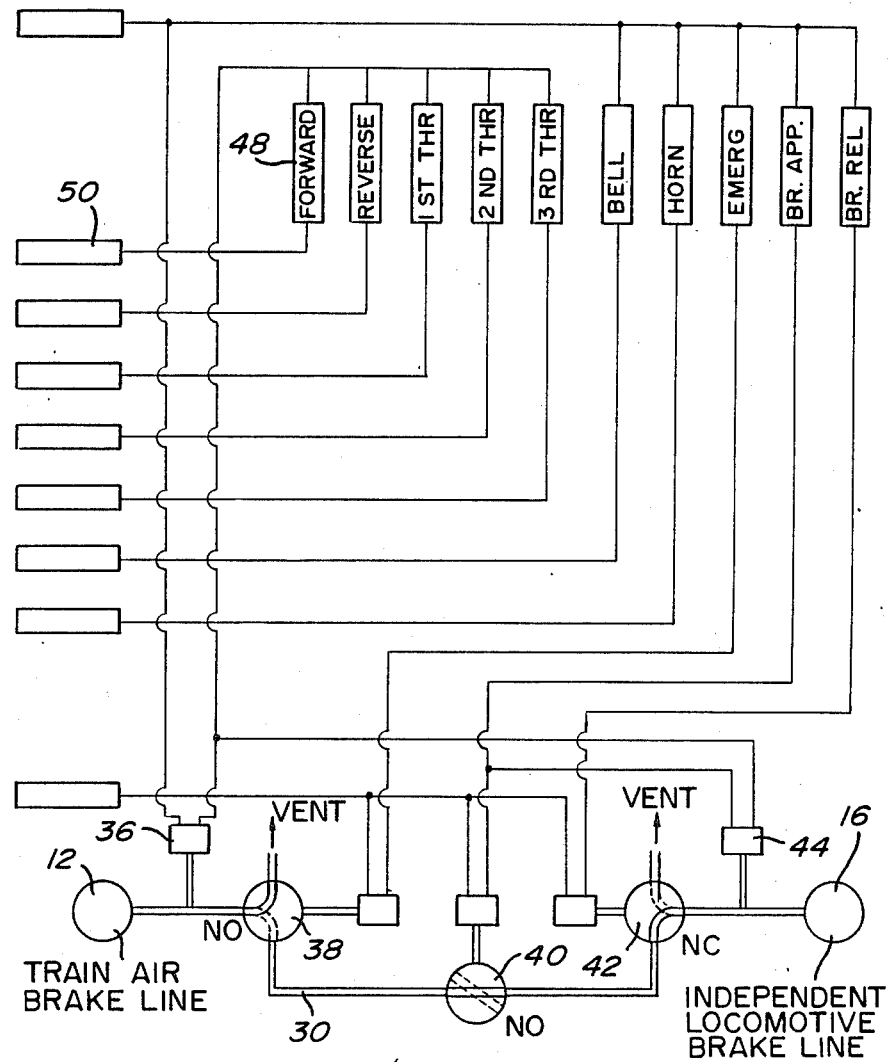
FIG. 4 is a block diagram of the air link assembly and power head assembly.

FIG. 4 illustrates a block diagram and power head circuit diagram for the air link assembly. The first pressure switch 36 is positioned in the yoke manifold 30 adjacent the air brake line 12. The pressure level is set at approximately 60 lbs. per sq. in., thus if the pressure in the air brake line 12 drops below this level, no power can be applied by the locomotive. A low pressure condition could occur if someone forgot to couple up the brake hose pipe to the yoke manifold 30, or if for any other reason the unit did not have pressure in the train air brake line. The emergency brake valve 38 must be energized for the remote control system to operate, failure to energize this unit immediately puts the train and/or locomotive into an emergency brake application, thus if the receiver on the locomotive is beyond the range of the hand held transmitter, or there is a signal loss for any other reason the solenoid deenergizes and the emergency brake applies. Alternatively, if the emergency switch 78 is pressed on the transmitter 60, then an emergency brake application occurs. The brake application valve 40 and brake release valve 42 are connected to the first and second steps or positions of the brake button 68. When the brake button 68 is depressed to its fullest extent, the solenoid for the brake release valve 42 is energized, thus venting the independent locomotive brake line which releases the brake. In this fully depressed position, the solenoid for the brake application valve 40 is energized and the brake application valve 40 is closed. When the brake button 60 is semi-depressed, the solenoid for brake release valve 42 is energized thus the valve 42 is closed and the brake application valve 40 is also closed so that any compressed air in the independent locomotive brake line 16 remains in the line. This permits a partial brake condition to be maintained. When the brake button 68 is released, then the brake release valve 42 remains closed, but the solenoid for the brake application valve 40 is de-energized and the brake application valve 40 opens, thus allowing compressed air from the air brake line 12 to pass through the orifice in the brake application valve 40 into the independent locomotive brake line 16 applying the brakes on the locomotive. When the pressure in the independent locomotive brake line exceeds about 45 PSI which is the pressure level set on the second pressure switch 44, the pressure switch 44 closes and energizes the solenoid for the brake application valve 40, closing the valve 40 and ensuring that pressure in the independent locomotive brake line does not exceed this pressure. Thus with the use of the brake application valve 40 and brake release valve 42, an operator can move the brake button 88 between off, semi-depressed and fully depressed, to graduate the brakes on and off to suit brake requirements in the same manner as can be done with the independent application and release valve in the cab of a locomotive.

The remote control system is installed at one end of a locomotive unit which may be a single unit or multiple units in which case the standard links would be made between several locomotive units to make them up into one multiple unit locomotive. The power head assembly 24 is plugged into the multiple operation receptacle 22 and the link assembly 20 is connected to the air brake line hose 12 and independent locomotive brake line 16. The valves for the air brake line 12 and independent locomotive brake line 6 are opened. In the cab of the locomotive unit the cut off valve is placed in the off position on Twenty Six Style air brake equipment, and the Rotair valve in trail position on Twenty Four Style Equipment. The independent brake valve handle is placed in the release position and then using the hand held signal transmitter 60, the appropriate switch is used to apply or release the locomotive brake to check its operation. The generator field and isolation switch in the cab are placed in the on and run positions. Some classes of locomotive may have other terminology for these controls. If required, the headlight may be placed in the on position and if the locomotive is made up of more than one unit, then isolation switches on trailing units may be changed to provide more or less power from the different units as required. The hand brake is then released and then using the signal transmitter, the locomotive may be removed as required.

To remove the remote control system, the reverse procedure should be followed and the locomotive unit is returned to cab control. The remote control system can then be used on another locomotive.

When more than one locomotive unit is used, it may be necessary to utilize diodes to isolate the horn and bell solenoids in all but the leading unit so that operation of the switches on the signal transmitter operates the horn and bell on the leading unit only. Other control features may be fitted to the signal transmitter. Sanding, lights etcetera may be included if desired.

Whereas one specific embodiment has been shown herein, it will be apparent that the concept of utilizing air from the train air brake line 12 to operate the independent locomotive brake 16 may be necessarily require the separate yoke system but could be built into a locomotive. Other changes may be made to the specific embodiments shown herein with the power head assembly built into the locomotive and a switch system provided for switching over from cab operation to remote operation.

Various changes may be made to the embodiments shown herein without departing from the scope of the invention which is limited only by the following claims.

The embodiments of an invention in which an exclusive property or privilege is claimed are defined as follows:

1. Remote control system for a locomotive having a train air brake line and an independent locomotive brake line comprising:

said train air brake line connected to operate the brakes on the entire train;

said independent locomotive brake line connected to operate only the brakes of the locomotive of the train;

air link between the train air brake line and the independent locomotive brake line;

brake control valve means in the air link;

operating means for the brake control valve means utilizing air from the train air brake line to control air pressure in the independent locomotive brake line;

receiver means attached to the locomotive for receiving radio instructions and producing signals for the operating means for the brake control valve means, direction of travel and throttle position for the locomotive; and transmitter means having control switches for an operator remote from the locomotive to send radio instructions to the receiver means.

2. The remote control system as claimed in claim 1 wherein the brake control valve means in the air link includes a solenoid operated brake release valve adjacent the independent locomotive brake line, the brake release valve adapted to open when the solenoid for the brake release valve is energized to vent the independent locomotive brake line; and a solenoid operated brake application valve between the brake release valve and the train air brake line, the brake application valve adapted to close when the solenoid for the brake application valve is energized to stop compressed air passing from the train air brake line to the independent locomotive brake line.

3. The remote control system as claimed in claim 2 including a solenoid operated emergency brake valve in the air link between the train air brake line and the brake application valve, the emergency brake valve adapted to close when the solenoid is energized to allow compressed air to pass through the air link, and open when the solenoid is de-energized to vent the train air brake line.

4. The remote control system as claimed in claim 3 including a first pressure switch adjacent the train air brake line, adapted to open circuits to prevent locomotive operation if pressure drops below a pre-set value.

5. The remote control system as claimed in claim 4 wherein the pre-set value is approximately 60 lbs. per sq. in.

6. The remote control system as claimed in claim 4 including a second pressure switch adjacent the independent locomotive brake line adapted to produce a signal to energize the solenoid for the brake application valve when the pressure in the independent locomotive brake line rises to a pre-set value.

7. The remote control system as claimed in claim 6 wherein the pre-set value is approximately 45 lbs. per sq. in.

8. The remote control system as claimed in claim 1 wherein the air link comprises a removable yoke that couples a hose from the train air brake line and a hose from the independent locomotive brake line together at one end of a locomotive unit, the yoke having a solenoid operated emergency brake valve, a solenoid operated brake application valve, a solenoid operated brake release valve in that order between the train air brake line and the independent locomotive brake line, a first pressure switch for air pressure maintenance in the yoke, and a second pressure switch for air pressure limit in the yoke.

9. The remote control system according to claim 8 wherein the solenoids for the valves in the yoke are coupled electrically to a control head that plugs into a multiple operation receptacle on the end of a locomotive unit.

10. The remote control system according to claim 1 wherein the receiver means comprises a control head having a radio receiver therein, a decoder, and a plurality of relays in circuits for the operating means on the brake control valve means in the air link, for direction of travel, throttle position in the locomotive, and other operations as required, the decoder adapted to decode radio signals from the radio receiver, and energize or de-energize the appropriate relays.

11. A remote control system as claimed in claim 10 wherein the control head is contained within an enclosed container that plugs into a multiple operation receptacle on one end of a locomotive unit.

12. The remote control system according to claim 11 wherein an aerial for the radio receiver is built into a handle for the enclosed container.

13. The remote control system according to claim 1 wherein the transmitter means comprises an encoder for encoding an instruction from switches on the transmitter means, and a radio transmitter for sending a signal, and wherein the receiver means comprises a radio receiver and a decoder for receiving and decoding the signal and passing the instruction to the operating means for the brake control valve means, direction of travel or throttle position for the locomotive, and other operations as required.

14. The remote control system according to claim 13 wherein the encoder in the transmitter means encodes up to about 70 different signals and the decoder in the receiver means decodes the same number of signals so that a plurality of locomotives can be remotely operated within the same area by different transmitters.

15. The remote control system according to claim 1 wherein the locomotive is made up of multiple units, the receiver means of the control system fits into one end of a locomotive unit in a multiple operation receptacle, and the air link couples a hose from the train air brake line and a hose from the independent locomotive brake line.

16. The remote control system as claimed in claim 1 including a separate control switch on the transmitter means to transmit a radio instruction to operate a horn or bell on the locomotive.

* * * * *